US012479697B2

(12) United States Patent
Hänninen et al.

(10) Patent No.: US 12,479,697 B2
(45) Date of Patent: Nov. 25, 2025

(54) COMMUNICATION SOLUTION FOR AN ELEVATOR SYSTEM

(71) Applicant: KONE Corporation, Helsinki (FI)

(72) Inventors: Ari Hänninen, Helsinki (FI); Tapio Tyni, Helsinki (FI); Ari Koivisto, Helsinki (FI)

(73) Assignee: KONE CORPORATION, Helsinki (FI)

(*) Notice: Subject to any disclaimer, the term of this patent is extended or adjusted under 35 U.S.C. 154(b) by 1471 days.

(21) Appl. No.: 17/022,326

(22) Filed: Sep. 16, 2020

(65) Prior Publication Data

US 2020/0407192 A1 Dec. 31, 2020

Related U.S. Application Data

(63) Continuation of application No. PCT/FI2018/050312, filed on Apr. 30, 2018.

(51) Int. Cl.
*B66B 5/00* (2006.01)
*B66B 1/24* (2006.01)
(Continued)

(52) U.S. Cl.
CPC .......... *B66B 5/0018* (2013.01); *B66B 1/2466* (2013.01); *B66B 1/3461* (2013.01);
(Continued)

(58) Field of Classification Search
CPC ... B66B 5/0018; B66B 1/2466; B66B 1/3461; B66B 1/468; B66B 2201/212; B66B 2201/4638; B66B 2201/4653
(Continued)

(56) References Cited

U.S. PATENT DOCUMENTS

2007/0089935 A1* 4/2007 Hikita .................. B66B 1/2433 187/249
2017/0174469 A1 6/2017 Chapman et al.
(Continued)

FOREIGN PATENT DOCUMENTS

CN 107000980 A 8/2017
CN 107010496 A 8/2017
(Continued)

OTHER PUBLICATIONS

International Search Report, issued in PCT/FI2018/050312, dated Jan. 4, 2019.
(Continued)

*Primary Examiner* — Kawing Chan
(74) *Attorney, Agent, or Firm* — Birch, Stewart, Kolasch & Birch, LLP

(57) ABSTRACT

An elevator system includes a plurality of elevator cars, an elevator controller communicatively coupled to the plurality of elevator cars. The elevator controller is configured to generate a signal to a first elevator car for indicating an elevator call to the first elevator car. The first elevator car is configured to, in response to a receipt of the signal, initiate a communication with at least one second elevator car for receiving information relating to a status of the at least one second elevator car, and in response to a receipt of the information, generate a control signal with respect to serving the elevator call received by the first elevator car. A method for controlling an elevator car in the elevator system is also disclosed.

21 Claims, 3 Drawing Sheets

(51) Int. Cl.
*B66B 1/34* (2006.01)
*B66B 1/46* (2006.01)

(52) U.S. Cl.
CPC ........ *B66B 1/468* (2013.01); *B66B 2201/212* (2013.01); *B66B 2201/4638* (2013.01); *B66B 2201/4653* (2013.01)

(58) Field of Classification Search
USPC .......................................................... 187/393
See application file for complete search history.

(56) References Cited

U.S. PATENT DOCUMENTS

| | | | | |
|---|---|---|---|---|
| 2017/0355553 | A1 | 12/2017 | Steinhauer et al. | |
| 2019/0190143 | A1* | 6/2019 | Moilanen | H01Q 9/0407 |

FOREIGN PATENT DOCUMENTS

| | | | |
|---|---|---|---|
| EP | 3 210 920 A1 | 8/2017 | |
| WO | WO 2007/142653 A1 | 12/2007 | |
| WO | WO 2017/097367 A1 | 6/2017 | |

OTHER PUBLICATIONS

Written Opinion of the International Searching Authority, issued in PCT/FI2018/050312, dated Jan. 4, 2019.

* cited by examiner

COMMUNICATION SOLUTION FOR AN ELEVATOR SYSTEM

CROSS REFERNECE TO RELATED APPLICATIONS

This application is a Continuation of PCT International Application No. PCT/FI2018/050312, filed on Apr. 30, 2018, which is hereby expressly incorporated by reference into the present application.

TECHNICAL FIELD

The invention concerns in general the technical field of elevators. More particularly, the invention concerns a solution for implementing communication in an elevator system.

BACKGROUND

Traditional elevator system is more or less always based on a concept in which one elevator car, or two elevator cars at maximum, is arranged to travel in an elevator shaft and the one and only elevator car serves all floors. Communication in such an elevator solution is arranged so that the elevator car communicates with an elevator controller, which is configured to control the elevator system. In case there are multiple elevator shafts in a building and each shaft has one elevator car operating in the corresponding shaft, only one elevator controller may be configured to manage the operation of the elevator system as a whole. Many times, the elevator controller is called as group controller for indicating that it may control a plurality of elevators. The controlling may e.g. refer to a selection of an elevator car, i.e. a shaft, to serve certain elevator call given in a certain location in the building and instructing the selected elevator car to travel to the location.

A technological development especially in a field of elevator motors has initiated multiple projects in order to introduce such an elevator system in which multiple elevator cars are traveling in one shaft and even to any direction along the shaft(s) arranged in the elevator system. This kind of multicar elevator solution naturally improves efficiency of the elevator system, but, on the other hand, brings in a plurality of technical challenges to be solved. An essential requirement of the elevator systems is safety and as is directly derivable arranging a safe use of an elevator in a multicar system having multiple elevator cars traveling in any direction may be a challenging task and needs to be thoroughly considered. One crucial element for achieving a desired level of safety is a communication within the elevator system which shall be accurate and efficient.

One drawback in using the traditional centralized elevator controller for controlling elevator cars in the context of multicar elevator system is an enormously increased amount of signaling. This is due to the fact that each elevator car would communicate with the central elevator controller, which, in turn, generates individual control signals to the elevator cars and other entities connected in the elevator system. Additionally, the computing power in the elevator controller is presumably high in order to meet the demand of the multicar system.

Hence, there is need to improve the existing communication solutions for elevator systems especially in order to make them better meet demands of multicar elevator systems.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an elevator system and a method for controlling an elevator car. Another objective of the invention is that the elevator system and the method enable a control of the elevator car, at least in part, on a basis of a communication between a plurality of elevator cars.

The objectives of the invention are reached by an elevator system and a method as defined by the respective independent claims.

According to a first aspect, an elevator system is provided, the elevator system comprising: a plurality of elevator cars equipped with a wireless communication device; an elevator controller communicatively coupled to the plurality of elevator cars equipped with the wireless communication device and the elevator controller is configured to generate a signal to a first elevator car for indicating an elevator call to the first elevator car; and wherein the first elevator car is configured to, in response to a receipt of the signal: initiate a communication with at least one second elevator car equipped with the wireless communication device for receiving information relating to a status of the at least one second elevator car; and in response to a receipt of the information relating to the status of the second elevator car generate a control signal with respect to serving the elevator call received by the first elevator car.

The information relating to the status of the second elevator car may comprise at least one of the following: current position, destination address, route, speed, acceleration, estimated travel time, estimated start time, door position, load, battery status, fault mode.

The control signal generated in response to the receipt of the information relating to the status of the second elevator car may comprise an instruction for controlling an operation of motion generation means of the first elevator car.

The first elevator car may be configured to, for a generation of the control signal with respect to serving the elevator call received by the first elevator car, to determine a point of time for initiating a travel in accordance with the information received in the communication by analyzing the received information on the status of the at least one second elevator car. The first elevator car may be configured to, for determining the point of time for initiating the travel, determine, by analyzing the received information, if the at least one position assigned to the at least one second elevator car is in conflict with a route of the first elevator car for serving the elevator call. Moreover, the first elevator car may be configured to determine the conflict between the route of the first elevator car for serving the elevator call and the at least one position assigned to the at least one second elevator car in response to a detection that the at least one position assigned to the at least one second elevator car prevents a travel of the first elevator car for serving the elevator call. The first elevator car may also be configured to, in response to the detection of the conflict, generate a signal instructing the at least one second elevator car to move for solving the conflict.

Alternatively or in addition, the at least one second elevator car may be configured to provide an estimation on a time of departure from its position in the communication with the first elevator car. The at least one second elevator car may be configured to determine the estimation on the time of departure at least partly based on a determination of time required for loading and unloading the at least one second elevator car.

The communication devices of the elevator cars may be configured to implement wireless communication having a maximum latency less than 20 ms.

The wireless communication may be implemented by a mobile communication network. For example, the mobile communication network may be a network implementing a 5th generation mobile communication technology.

According to a second aspect, a method for controlling an elevator car in an elevator system is provided, the elevator system comprising: a plurality of elevator cars equipped with a wireless communication device; an elevator controller communicatively coupled, in a wireless manner, to the plurality of elevator cars equipped with the wireless communication device; the method comprising: receiving a signal by a first elevator car from the elevator controller for indicating an elevator call to the first elevator car; initiating a communication by the first elevator car with at least one second elevator car equipped with the wireless communication device for receiving information relating to a status of the at least one second elevator car; generating, in response to a receipt of the information relating to the status of the second elevator car, a control signal with respect to serving the elevator call received by the first elevator car.

The information relating to the status of the second elevator car may comprise at least one of the following: current position, destination address, route, speed, acceleration, estimated travel time, estimated start time, door position, load, battery status, fault mode.

The control signal generated in response to the receipt of the information relating to the status of the second elevator car may comprise an instruction for controlling an operation of motion generation means of the first elevator car.

The method may further comprise, for a generation of the control signal with respect to serving the elevator call received by the first elevator car, to determine a point of time for initiating a travel in accordance with the information received in the communication by analyzing the received information on the status of the at least one second elevator car. An analysis of the received information may comprise a step of determining if the at least one position assigned to the at least one second elevator car is in conflict with a route of the first elevator car for serving the elevator call. Moreover, the conflict between the route of the first elevator car for serving the elevator call and the at least one position assigned to the at least one second elevator car may be determined in response to a detection that the at least one position assigned to the at least one second elevator car prevents a travel of the first elevator car for serving the elevator call. The method may further comprise, in response to the detection of the conflict, a step of generating a signal instructing the at least one second elevator car to move for solving the conflict.

Alternatively or in addition, the method may further comprise a step of providing an estimation on a time of departure, by the at least one second elevator car, from its position in the communication with the first elevator car. The method may further comprise a step of determining, by the at least one second elevator car, the estimation on the time of departure at least partly based on a determination of time required for loading and unloading the at least one second elevator car.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
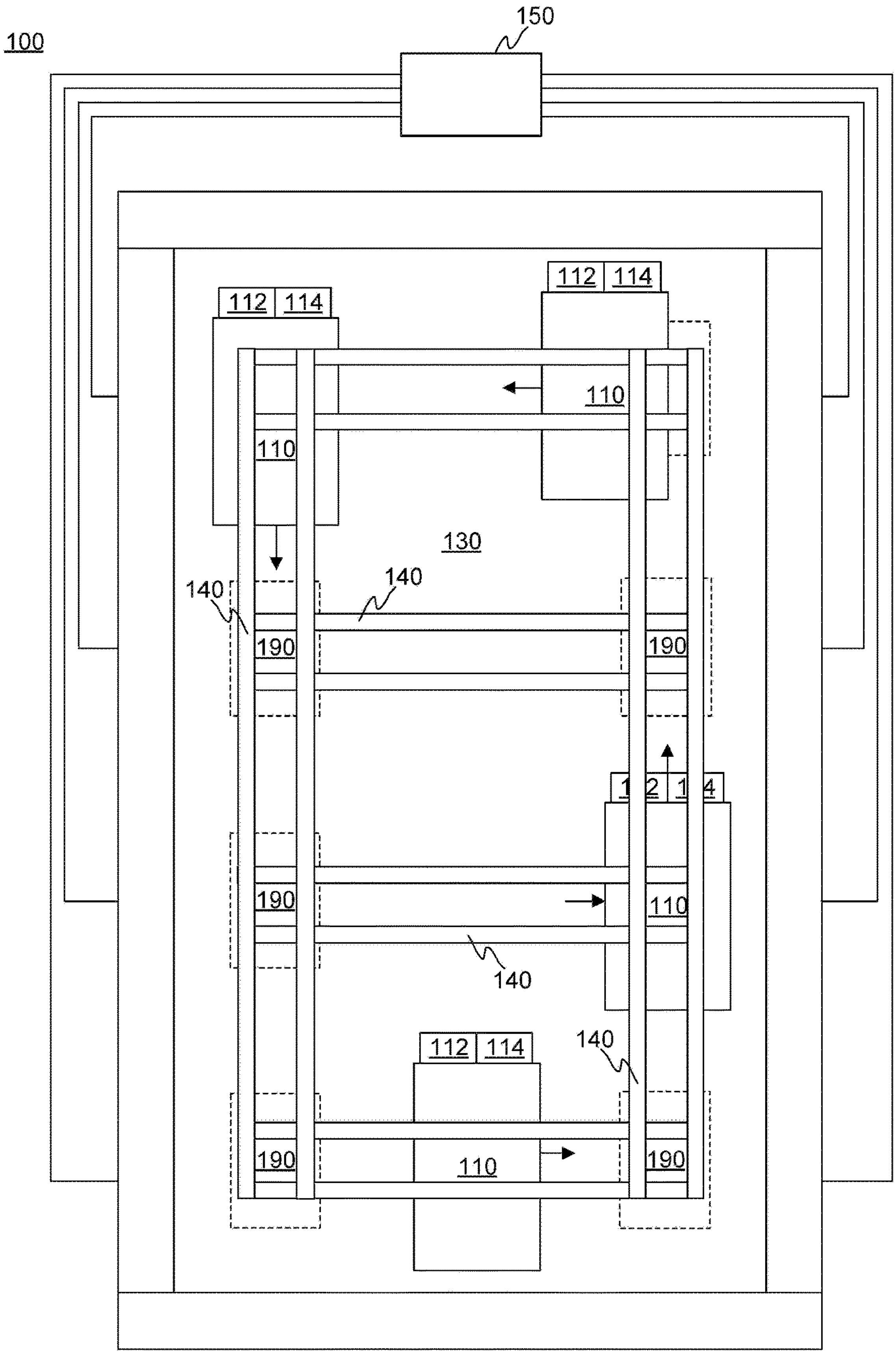
FIG. 1 illustrates schematically an elevator system according to an embodiment of the present invention.

FIG. 1 illustrates schematically an elevator system 100 according to an embodiment of the present invention. The elevator system 100 may comprise at least one or a plurality of elevator cars 110 arranged to travel in an elevator shaft 130 or the elevator car pathway 130. The elevator car(s) 110 may comprise at least one first part of motion generation means 112, such as an electrical drive, such as a frequency converter or an inverter, and/or and an electric motor, such as a linear motor. Additionally, the elevator car(s) may be configured to carry energy storage, such as a battery or batteries. As said, the one first part of the motion generation means may be utilized for operating a mover arranged to the elevator car 110 for moving the elevator car 110 in question along the elevator shaft 130. There may also be other electrically operated equipment in the elevator car 110 such as lighting, doors, user interface, emergency rescue equipment, etc. The energy storage may, preferably, be electrically coupled to the motion generation means 112, for example, to the intermediate circuit of the drive, for providing electrical power to the motion generation means 112.

For describing at least some aspects of the present invention the elevator system may comprise at least two landing locations 190, such as landing floors. The landing locations 190 may consist of landing floor doors or openings. In an example of FIG. 1 there are two horizontally separated sets, or "columns", of vertically aligned landing locations. However, the example shown in FIG. 1 is a non-limiting example for describing at least some aspects of the invention.

Regarding the elevator shaft, referred with 130 in FIG. 1, it may be implemented so that the shaft defines a substantially closed volume in which the elevator cars 110 are adapted and configured to be moved. The walls may be, for example, of concrete, metal or at least partly of glass, or any combination thereof. The elevator shaft 130 herein refers basically to any structure or pathway along which the elevator car 110 is configured to be moved.

In a multi-car solution, according to an embodiment as schematically illustrated in FIG. 1, the elevator car 110 or cars 110 may be moved along the elevator shaft 130 vertically and/or horizontally depending on the direction of stator beams 140 arranged in the shaft 130. According to embodiments similar to one in FIG. 1 in this respect, the elevator car 110 or elevator cars 110 may be configured to be moved along a number of vertical and/or horizontal stator beams 140, for example, two beams such as in FIG. 1. The stator beams 140 are part of an electric linear motor of the elevator system 100, i.e. forming at least one other part of motion generation means, utilized to move the elevator car 110 or elevator cars 110 in the elevator shaft 130. The stator beams 140 may, preferably, be arranged in fixed manner, that is, stationary with respect to the elevator shaft 130, for example, to a wall of the shaft by fastening portions, which may be arranged to rotatable at direction changing positions of the elevator car 110.

The generation of the motion for the elevator cars 110 in the described multi-car solution of FIG. 1 is based on an electro-magnetic interaction between the at least one first power generation means 112 and the stator beams 140 acting as the at least one other part of the motion generation means.

In addition to the above described elements and entities the elevator system 100 may further comprise a communication device 114 coupled to the elevator car 110 or cars 110 belonging to the elevator system 100. The communication device 114 may advantageously be configured to implement a wireless communication technology and the communication devices 114 coupled to the elevator cars 110 may at least communicate directly to each other. The communication device 114 may comprise a communication interface implementing at least one communication technology and a processing unit and a memory unit for controlling and managing the operation of the communication device. Additionally, the communication device 114 may comprise an interface for signaling with other entities of the elevator car 110. This may e.g. be implemented in a wired manner. Naturally, the communication device 110 is provided with electric power e.g. from the electric storage carried by the elevator car 110 in question and/or from any electric source supplying electric power to the elevator car unit. The processing unit as well as the memory unit may, in some embodiment, be implemented as external devices to the communication device 114. For example, they may be configured to serve the elevator car 110 as a whole i.e. generating necessary control signals e.g. in response to a receipt of input from some external entities, such as from a user interface residing in the elevator car 110, but also for cooperating with the communication device 114.

Still further, the elevator system 100 according to an embodiment of the invention may comprise an elevator controller 150 for implementing some tasks for operating the elevator system 100. The term elevator controller 150 shall be understood as a device which is suitable for at least controlling at least some functions of the elevator system. The elevator controller 150 may be coupled to other entities in a wired or wireless manner. The other entities may e.g. refer to elevator cars, elevator call devices residing e.g. in at least some landing locations and/or destination operating panels providing an indication of a status of an elevator system or an elevator car. Naturally, the elevator controller is provided with electrical power and signaling enabling its operation. The elevator controller 150 may locate 'anywhere' in the building or outside the building (e.g. as a cloud computer). It may be separate unit or can be located inside destination operating panel or another elevator component. There may be a plurality of elevator controllers 150 in the system, one or more controlling the system simultaneously at least in part, or consecutively to each other.

The solution according to the present invention may be based on an idea that each elevator car 110 belonging to the elevator system 100 is aware of its position in the elevator shaft 130. The determination of the position may be performed in the elevator car 110 comprising necessary means of performing the positioning or it may be performed by an external device, such as by an elevator controller 150, which is configured to receive necessary measurement data for the determination of the position, and communicating it to any entity, such as to an elevator car 110 whose position is determined. The determination of the position may be based on any positioning system, such as a rotary encoder based positioning in which the encoder obtains data from the elevator drive for determining a position of the elevator car or an indoor positioning system based on radio signals, or any sensor based solution in which one or more applicable sensors are positioned in the elevator car 110 so that they may detect predetermined items mounted in the elevator shaft in known positions so that the elevator car may determine its position based on the detection or detections. As an example of a positioning system based on radio signals, the positioning may be performed with one or more radar type sensors mounted either on the elevator car or cars 110, or in an applicable location in the shaft, wherein the position of an elevator car may be determined from the received radio signals. The sensor-based solution may also be based on reading of position marks implemented e.g. in the shaft with one or more applicable sensors, for instance.

Moreover, the elevator controller 150 may be configured to communicate, e.g. in response to a receipt of an elevator call, with at least one elevator car 110 belonging to the elevator system 100 for providing a request to serve the elevator call. The serve of the elevator call may refer to a procedure in which an indication on a landing floor, which may also be called as a destination address, is transmitted to the elevator car 110 in question with any necessary information in order to instruct the elevator car 110 to move to the destination floor in question. In some embodiment, the elevator controller 150 may be configured to select the elevator car 110 to which it transmits the request to serve. For selecting the elevator car 110 the elevator controller 150 may be configured to take into account a status of an elevator car 110, wherein the status of the elevator car may comprise at least one of the following: current position, destination address, route, speed, acceleration, estimated travel time, estimated start time, door position, load, battery status, fault mode as non-limiting examples of parameters which may be used for the selection of the elevator car 110. The information on the destination address may refer to an indication of a floor on which a passenger resides or a destination floor of the passenger, or both, for example.

Next, some aspects of the present invention are disclosed in a situation in which a first elevator car 100 possesses information on its position in the elevator shaft as well as the destination floor. For example, the elevator controller 150 may have informed the destination floor to the first elevator car 100 in response to a receipt of an elevator call from a passenger residing on a certain floor. The first elevator car 110 possessing the information may be configured to initiate a communication with at least one other elevator car 110 so that the elevator cars 110 may exchange information. The exchange of information may at least refer to transfer of information from the first elevator car 110 possessing the mentioned information to at least one second elevator car 110, which information may represent information on a route assigned to the first elevator car 110. In one embodiment of the present invention the route may refer to data indicating the destination of the first elevator car 110. According to another embodiment the route may refer to details disclosing the route from the current position of the first elevator car 110 to the destination floor. The route may be defined through route calculation procedure wherein the route calculation procedure is configured so that it is aware of available routes defined by the stator beams 140 in the elevator shaft 130 and it is configured to define a route which meets at least one predetermined criteria, such as the fastest route.

Correspondingly, the at least one second elevator car 100 may inform at least the first elevator car 110 on a status of the second elevator car in question. The information transferred from the second elevator car 110 to the first elevator car 110 may correspond to the information transferred from the first elevator car 110 to the at least one second elevator car 110. In some situation the at least one second elevator car 110 may not possess information on a destination floor, or a route, e.g. due to a situation that no destination is assigned to it, but it may reside on a route of the first elevator car 110.

Now the first elevator car is aware of its destination as well as of a status of at least one second elevator car 110 wherein the status may refer to a destination, or a route, assigned to the at least one second elevator car 110 or an indication that the at least one second elevator car 110 is not occupied. The first elevator car 110 may now, by comparing the destination route assigned to it with the position of the at least one second elevator car 110 at the time of communication or when the second elevator car 110 execute the assigned route, determine if they have a conflicting location at some point during the travel. The conflicting location shall be understood at least to cover a situation in which the at least one second elevator car 110 blocks the first elevator car 110 to travel the determined route to the destination floor. As is clear the blocking may occur if the at least one second elevator car 110 is parked in a position, such as on a floor, through which the first elevator car 110 shall travel to the destination floor, or if both elevator cars 110 may end up to the same location at the same time when both are executing the assigned routes. According to an embodiment of the invention the first elevator car 110 may, in response to a detection of the conflict, generate and transmit an instruction to the at least one second elevator car 110 to command the at least one second elevator car 110 to move so that it frees the route of the first elevator car 110 in the shaft so that the first elevator car 110 may travel to the destination floor. According to another embodiment the first elevator car 110 may be configured to instruct the at least one second elevator car 110 to generate a control signal for affecting an operation parameter causing the at least one second elevator car 110 to control its speed or acceleration, for example, and in that manner to set the route free for the first elevator car 110. The instruction transmitted by the first elevator car 110 to the at least one second elevator car 110 may also be received by the elevator controller 150 either at the same time or it is transmitted to the at least one second elevator car 110 separately. Informing the elevator controller 150 may be advantageous due to task of the elevator controller 150 in selecting the elevator cars 110 optimally for serving the passengers. In some embodiments, the second elevator car 110 may acknowledge the receipt of the instruction and execution according to the instruction at least to the first elevator car 110, but also to the elevator controller 150 in some embodiments. As a result of the above described operation the first elevator car 110 may determine an optimal point of time for initiating a travel.

Herein the communication between the elevator cars 110 may be implemented so that the wireless communication is performed over one or more base stations arranged so that it may serve the communication between the elevator cars 110, and with any other entities. The base station, or stations, may e.g. be positioned in the elevator shaft so that the network coverage is at a necessary level in the solution according to the present invention.

In the following some further aspects are given in view of the present invention. Namely, the exchange of information especially relating to the routes of the different elevator cars 110 enables a development of a more sophisticated solutions which may improve safety of the elevator system or a passenger satisfaction, for example. In one embodiment information relating to acceleration and deceleration of an elevator car 110 may be known. In such a case the elevator cars 110, when determining an instant of time to initiate the travel may take into account e.g. an acceleration speed of the second elevator car 110 as well as a deceleration speed of itself in response to braking and in that manner to determine a safe instant of time to initiate the travel so that distance between the elevator cars 110 is acceptable. Naturally, the same information may be taken into account when the elevator cars 110 are traveling and there occurs a situation that the latter car needs to make an emergency stop.

Correspondingly, the communication between the elevator cars 110 enable an adjustment of mutual speeds of the elevator cars 110 especially in a situation in which the elevator cars 110 may detect the speeds of each other in one way or another. This may e.g. happen so that each elevator car 110 may determine its own speed and broadcast that piece of information to at least one other elevator car 110 e.g. having a conflicting route with the elevator car 110 in question. As a result, the at least one other elevator car 110 may adjust its speed accordingly. The elevator car 110 which is instructed to adjust its speed may be selected in accordance with predetermined rules. The rules may be based on priorities assigned to elevator cars, priorities assigned to different routes in the shaft, a number of passengers in an elevator car 110, and so on.

In some further embodiment the safety of the system may be improved so that if a certain elevator car 110 does not receive information from at least one other elevator car 110 wherein the information e.g. comprises position information on the at least one other elevator car 110 the certain elevator car 110 is configured to avoid traveling in the location from where the at least one other elevator car 110 was last detected. This kind of approach may e.g. be arranged so that the elevator cars 110 operating in the same shaft are configured to broadcast their position to other cars 110 and the elevator cars 110 maintain data record storing the positions. When a position of at least one elevator car 110 is missing, the position with a safety margin if applicable may be blocked out as a destination to the other cars 110, for example.

Moreover, in one embodiment it may be arranged that the elevator cars 110 may deliver an estimation on an instant of time when it may departure from its current position, such as from a landing floor. According to the embodiment the elevator cars 110 may be configured to receive information by means of which it may determine the estimation for the departure time. The information by means of which the estimation may be determined may e.g. comprise a number of passengers entering the elevator car 110 in question and a number of passengers exiting from the elevator car 110 in question. The numbers of passengers may e.g. be determined with applicable sensor solution implemented both at the landing floor and in the elevator car 110. The sensor may e.g. be a camera which is configured to capture an image on a space and by means of image recognition the number of passengers at each space may be determined. Further, an average time for loading and/or unloading a passenger, for example, may be known e.g. through measurement and statistical analysis, and in that manner it is possible to generate an estimation on the instant of time of the departure. The information received by at least one other elevator car 110 may be taken into account in the determination of the instant of time for initiating the travel of the at least one other elevator car 110.

The wireless communication technology used at least in communication between the elevator cars 110 shall be such that the connection is reliable. Thus, the delay in communication shall be as short as possible due to the application area, where the safety plays especially important role. In other words, the latency in communication, especially in the worst case scenario, shall be acceptable, or at least the latency is advantageously taken into account in the determination of the point of time of initiating the travel. For example, in some embodiment of the invention the wireless communication may be implemented by a mobile communication network. The mobile communication technology used in communication between the elevator cars 110 may be based on 5G (5th generation mobile communication technology). Advantageously, the communication devices of the elevator cars 110 implement a wireless communication having a maximum latency less than 20 ms.

Figure 2:
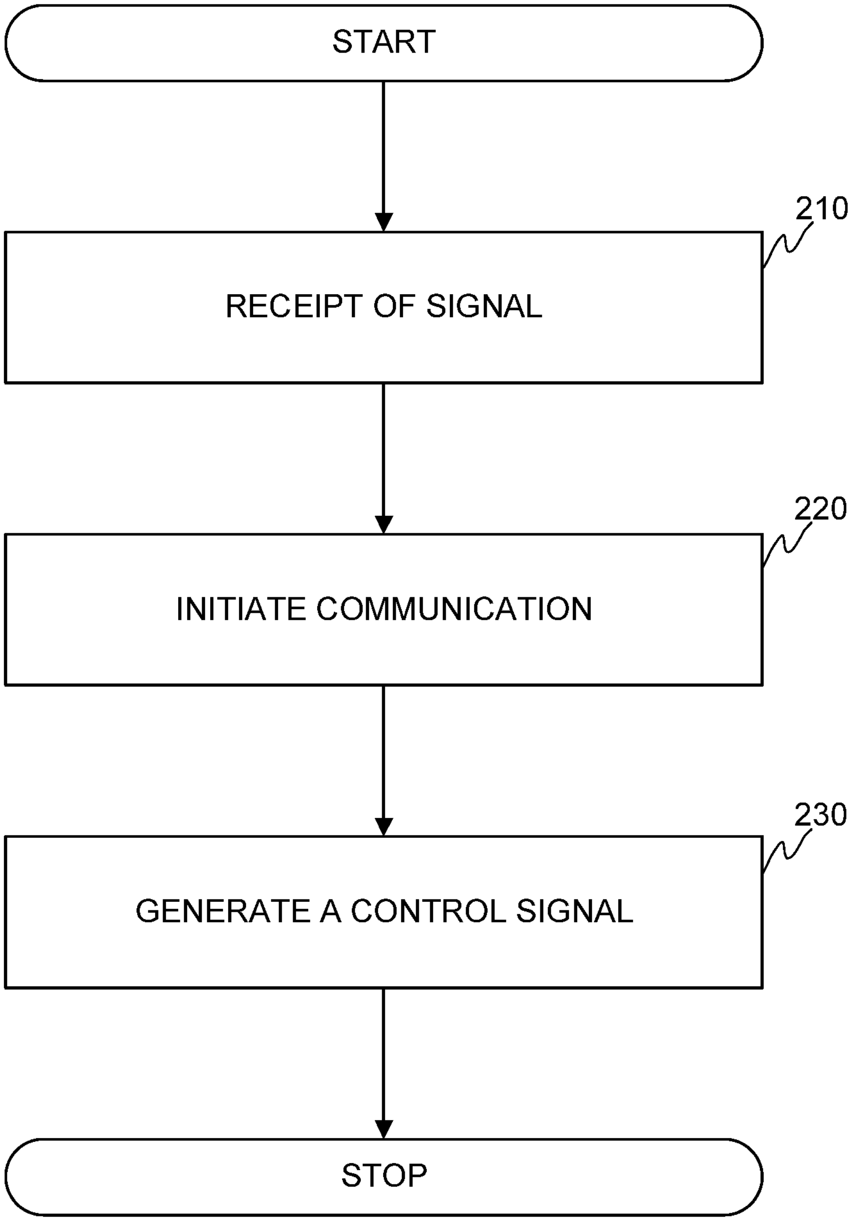
FIG. 2 illustrates schematically a method according to an embodiment of the invention.

FIG. 2 schematically illustrates a method according to the present invention from a point of a first elevator car 110. As already described an elevator controller 150 may receive indications that a passenger needs a service of the elevator system in a form of an elevator call. The elevator controller 150 may be configured to generate a signal, in response to the receipt of the information carried in the elevator call, to a first elevator car for indicating the elevator call to the first elevator car 110. The first elevator car 110 may receive the signal 210, which signal may e.g. carry information on a landing floor, or any other destination address, or in some other embodiment the signal may carry information on a route the first elevator car 110 shall execute in the elevator shaft. The route shall be understood at least to cover instructions defining a chain of positions by means of which the elevator car 110 is able to execute the travel so that the final position corresponds to the landing floor. In case the signal comprises only the landing floor the first elevator car 110 may be configured to determine the route by itself by applying pre-defined rules for determining the route from its current position to the destination floor. Now, the first elevator car 110 may initiate a communication 220 with at least one second elevator car 110 for determining a status of the second elevator car 110. The determination of the status of the second elevator car 110 may comprise information on at least one of the following: current position, destination address, route, speed, acceleration, estimated travel time, estimated start time, door position, load, battery status, fault mode, for example. In other words, the information may relate either directly or indirectly to travel related aspects of the second elevator car 110. The communication may be implemented in a wireless manner by utilizing wireless communication devices 140 of the elevator cars 110. In the communication the elevator cars 110 may exchange information relating to their status, as described above. Generally speaking, the information on a position of the elevator car shall be understood to cover at least a current position of the elevator car 110 in question and a chain of positions if a route is assigned to the elevator car 110. Now, the first elevator car 110 may possess information on one or more positions assigned to the at least one second elevator car 110 as well as it is aware of a route assigned to itself. Finally, the first elevator car 110 may be configured to generate a control signal with respect to serving the elevator call received from the elevator controller 150.

In an embodiment of the invention, the first elevator car 110 may be configured to analyze the information on the status of the second elevator car received through the communication. The analysis may comprise that the first elevator car 110 is configured to compare if its route, i.e. a position at some instant of time, conflicts with a position, or a route, of at least one other elevator car 110. The conflict shall be understood to cover at least a situation in which at least one second elevator car 110 prevents a travel of the first elevator car 110. Moreover, a duration of the prevention of the travel may also be taken into account. In response to the analysis the first elevator car 110 may communicate with the at least one second elevator car 110, e.g. for solving the determined conflict in the analysis, and eventually it may possess enough information for determining a point of time for initiating a travel in accordance with the information received in the elevator call signal. In the determination of the point of time other rules and/or constraints may be taken into account, such as safety margins defined for the system. In response to an outcome of the analysis the first elevator car 110 may generate a control signal 230 for initiating the travel in accordance with the determined point of time.

Figure 3:
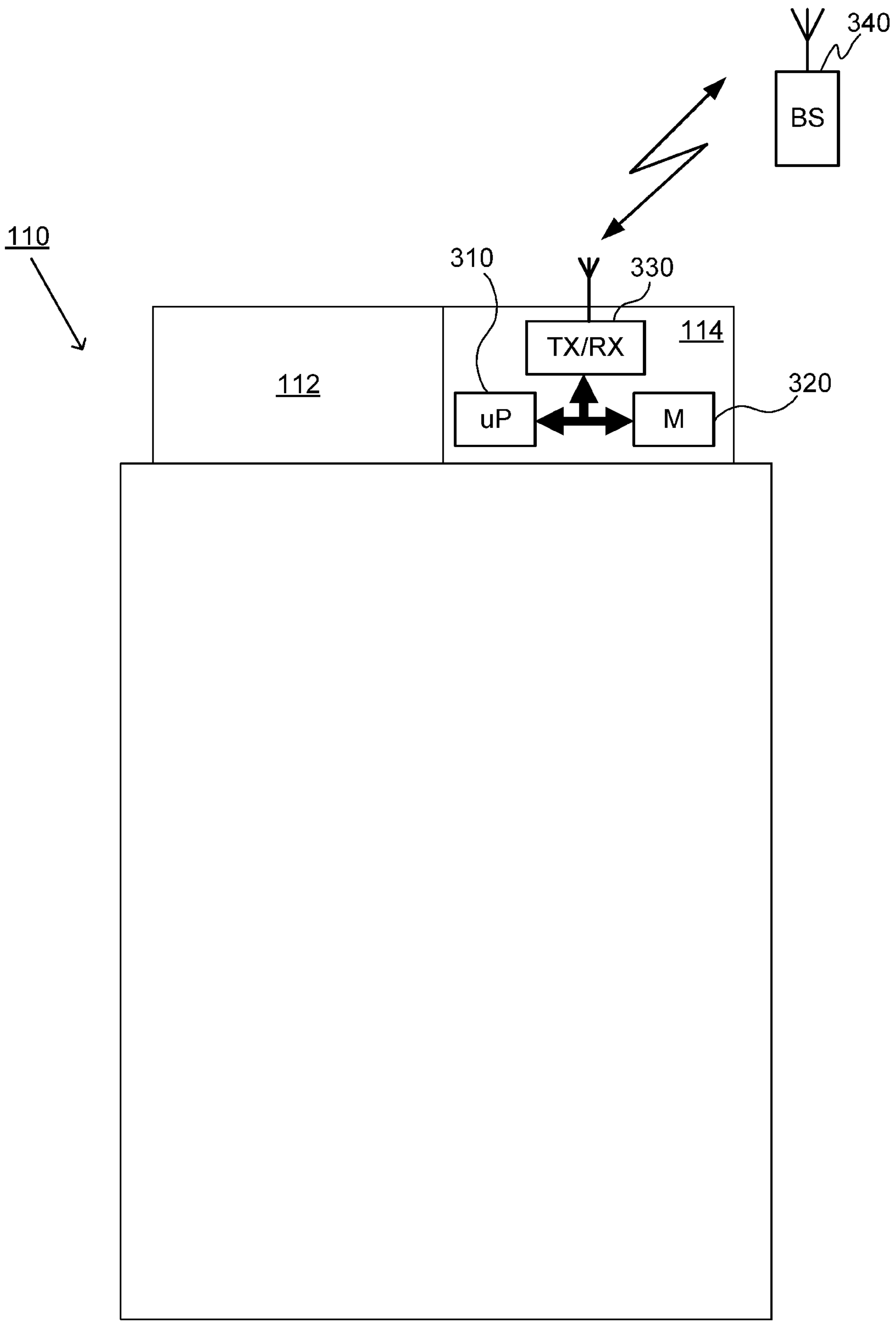
FIG. 3 illustrates schematically an elevator car according to an embodiment of the invention.

FIG. 3 schematically illustrates an example of an elevator car 110 which may be used in an implementation of the present invention. In the schematic illustration the elevator car 110 may comprise the motion generation means 112 and the communication device 114 implementing at least a wireless communication technology used in the elevator system. The communication device 114 may comprise a processing unit 310 comprising one or more processors, a memory 320 for storing data, such as computer program code, and a transmitter/receiver module 330. Naturally, the communication device may comprise other devices and modules which are not depicted in FIG. 3. A control of the elevator car 110 may also be executed by the communication device 114. The communication device 114 may thus control a generation of a control signal with respect to serving the elevator call in accordance of the communication with the other elevator cars 110 and the elevator controller 150. The control may comprise, but is not limited to, the generation of the control signal causing motion generation means to generate a power for moving the elevator car 110 as well as adjustment of a parameter affecting the power in order to adjust a speed of the elevator car 110, for example. In FIG. 3 it is also illustrated a base station 340 over which the elevator cars 110 may communicate with each other, and with any other entities.

The invention as described herein is especially advantageous in an elevator environment in which the elevator cars 110 are equipped with the motion generation means 112 and, hence, capable of independent motion in the elevator shaft. By enabling the communication between the elevator cars 110, e.g. over a base station, resource requirements needed in the elevator controller 150 side may be reduced, and at least in some situations an efficiency and a safety of the elevator system may be improved.

For sake of clarity, it is worthwhile to mention that the term elevator call in the context of the present invention shall be understood to cover any call indicating that at least one elevator car 100 shall serve the call. Thus, the elevator call may origin from a call device by means of which a request of service is indicated, e.g. by a passenger, to the elevator system. This kind of call device may e.g. reside on a floor the passenger resides. In some embodiment the call device may be a mobile device available for use to a passenger or it may be received from a cloud computing system. The elevator call shall also be understood to cover a solution in which the call is generated in response to an analysis of predetermined data e.g. statistically in order to control the operation of the elevator system. Moreover, the elevator call covers in this context also an indication on a destination address to which a passenger is willing to travel once the elevator car arrives. Still further, the elevator call may cover any combination of these two.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An elevator system comprising:

a plurality of elevator cars each equipped with a wireless communication device, the plurality of elevator cars including a first elevator car and at least one second elevator car;

an elevator controller communicatively coupled to the plurality of elevator cars each equipped with the wireless communication device, the elevator controller being configured to generate a signal to the first elevator car for indicating an elevator call to the first elevator car, wherein the first elevator car is configured to, in response to a receipt of the signal:

initiate a direct communication with the at least one second elevator car equipped with the wireless communication device for receiving information relating to a status of the at least one second elevator car; and in response to a receipt of the information relating to the status of the second elevator car, autonomously generate a control signal in accordance with the direct communication between the first elevator car and the at least one second elevator car with respect to serving the elevator call received by the first elevator car.

2. The elevator system of claim 1, wherein the information relating to the status of the second elevator car comprises at least one of the following: current position, destination address, route, speed, acceleration, estimated travel time, estimated start time, door position, load, battery status, fault mode.

3. The elevator system of claim 1, wherein the control signal generated in response to the receipt of the information relating to the status of the second elevator car comprises an instruction for controlling an operation of a motion generator of the first elevator car.

4. The elevator system of claim 1, wherein the first elevator car is configured to, for a generation of the control signal with respect to serving the elevator call received by the first elevator car, determine a point of time for initiating a travel in accordance with the information received in the communication by analyzing the received information on the status of the at least one second elevator car.

5. The elevator system of claim 4, wherein the first elevator car is configured to, for determining the point of time for initiating the travel, determine, by analyzing the received information, if at least one position assigned to the at least one second elevator car is in conflict with a route of the first elevator car for serving the elevator call.

6. The elevator system of claim 5, wherein the first elevator car-is configured to determine a conflict between the route of the first elevator car for serving the elevator call and the at least one position assigned to the at least one second elevator car in response to a detection that the at least one position assigned to the at least one second elevator car prevents a travel of the first elevator car for serving the elevator call.

7. The elevator system of claim 6, wherein the first elevator car-is configured to, in response to the detection of the conflict, generate a signal instructing the at least one second elevator car to move for solving the conflict.

8. The elevator system of claim 1, wherein the at least one second elevator car is configured to provide an estimation on a time of departure from its position in the communication with the first elevator car.

9. The elevator system of claim 8, wherein the at least one second elevator car is configured to determine the estimation on the time of departure at least partly based on a determination of time required for loading and unloading the at least one second elevator car.

10. The elevator system of claim 1, wherein the communication devices of the elevator cars are configured to implement wireless communication having a maximum latency less than 20 ms.

11. The elevator system of claim 1, wherein the wireless communication is implemented by a mobile communication network.

12. The elevator system of claim 11, wherein the mobile communication network is a network implementing a 5th generation mobile communication technology.

13. A method for controlling an elevator car in an elevator system, the elevator system comprising:

a plurality of elevator cars each equipped with a wireless communication device, the plurality of elevator cars including a first elevator car and at least one second elevator car; and an elevator controller communicatively coupled, in a wireless manner, to the plurality of elevator cars each equipped with the wireless communication device, the method comprising the steps of:

receiving a signal by the first elevator car from the elevator controller for indicating an elevator call to the first elevator car;

initiating a direct communication by the first elevator car with the at least one second elevator car-equipped with the wireless communication device for receiving information relating to a status of the at least one second elevator car; and autonomously generating, in response to a receipt of the information relating to the status of the second elevator car, a control signal in accordance with the direct communication between the first elevator car and the at least one second elevator car with respect to serving the elevator call received by the first elevator car.

14. The method of claim 13, wherein the information relating to the status of the second elevator car comprises at least one of the following: current position, destination address, route, speed, acceleration, estimated travel time, estimated start time, door position, load, battery status, fault mode.

15. The method of claim 13, wherein the control signal generated in response to the receipt of the information relating to the status of the second elevator car comprises an instruction for controlling an operation of a motion generator of the first elevator car.

16. The method of claim 13, further comprising, for a generation of the control signal with respect to serving the elevator call received by the first elevator car, the step of determining a point of time for initiating a travel in accordance with the information received in the communication by analyzing the received information on the status of the at least one second elevator car.

17. The method of claim 16, wherein an analysis of the received information comprises a step of determining if at least one position assigned to the at least one second elevator car is in conflict with a route of the first elevator car for serving the elevator call.

18. The method of claim 17, wherein the conflict between the route of the first elevator car for serving the elevator call and the at least one position assigned to the at least one second elevator car is determined in response to a detection that the at least one position assigned to the at least one second elevator car prevents a travel of the first elevator car for serving the elevator call.

19. The method of claim 18, wherein the method further comprises, in response to the detection of the conflict, a step of generating a signal instructing the at least one second elevator car to move for solving the conflict.

20. The method of claim 13, wherein the method further comprises a step of providing an estimation on a time of departure, by the at least one second elevator car, from its position in the communication with the first elevator car.

21. The method of claim 20, wherein the method further comprises a step of determining, by the at least one second elevator car, the estimation on the time of departure at least partly based on a determination of time required for loading and unloading the at least one second elevator car.

* * * * *